United States Patent [19]

Cody et al.

[11] Patent Number: 4,906,601

[45] Date of Patent: Mar. 6, 1990

[54] SMALL PARTICLE LOW FLUORIDE CONTENT CATALYST

[75] Inventors: Ian A. Cody, Clearwater; David L. Brown, Ontario, both of Canada

[73] Assignee: Exxon Research and Engineering Company, Florham Park, N.J.

[21] Appl. No.: 285,437

[22] Filed: Dec. 16, 1988

[51] Int. Cl.$^4$ .......................... B01J 27/12; B01J 27/13
[52] U.S. Cl. .................................................... 502/230
[58] Field of Search .......................................... 502/230

[56] References Cited

U.S. PATENT DOCUMENTS

| | | | |
|---|---|---|---|
| 2,668,790 | 2/1954 | Good et al. | 196/50 |
| 2,668,866 | 2/1954 | Good et al. | 260/683.5 |
| 2,779,713 | 1/1957 | Cole et al. | 196/35 |
| 2,817,693 | 12/1957 | Koome et al. | 260/683.5 |
| 2,838,444 | 6/1958 | Teter et al. | 196/50 |
| 2,914,464 | 11/1959 | Burton et al. | 208/138 |
| 3,078,323 | 2/1963 | Kline et al. | 260/683.65 |
| 3,121,696 | 2/1964 | Hoekstra et al. | 252/441 |
| 3,125,511 | 3/1964 | Tupman et al. | 260/683.5 |
| 3,206,525 | 9/1965 | Michales et al. | 260/683.66 |
| 3,268,439 | 8/1966 | Tupman et al. | 208/112 |
| 3,308,052 | 3/1967 | Ireland et al. | 208/27 |
| 3,365,390 | 1/1968 | Egan et al. | 208/60 |
| 3,486,993 | 12/1969 | Egan et al. | 208/89 |
| 3,487,005 | 12/1969 | Egan et al. | 208/59 |
| 3,629,096 | 12/1971 | Divijak | 208/89 |
| 3,709,817 | 1/1973 | Suggitt et al. | 208/112 |
| 3,711,399 | 1/1973 | Estes et al. | 208/112 |
| 3,717,586 | 2/1973 | Suggitt et al. | 252/439 |
| 3,794,580 | 2/1974 | Ladeur | 208/110 |
| 3,830,723 | 8/1974 | Ladeur et al. | 208/208 |
| 3,864,425 | 2/1975 | Gardner | 260/683.68 |
| 3,915,843 | 10/1975 | Franck et al. | 208/112 |
| 4,186,078 | 1/1980 | Itoh et al. | 208/27 |
| 4,263,127 | 4/1981 | Rausch et al. | 208/58 |
| 4,263,127 | 4/1981 | Rausch et al. | 208/58 |
| 4,444,895 | 4/1984 | Fung et al. | 502/230 X |
| 4,695,365 | 9/1987 | Ackelson et al. | 208/89 |

FOREIGN PATENT DOCUMENTS

| | | |
|---|---|---|
| 823010 | 11/1959 | United Kingdom . |
| 848198 | 9/1960 | United Kingdom . |
| 951997 | 3/1964 | United Kingdom . |
| 1065205 | 4/1967 | United Kingdom . |
| 1218920 | 1/1971 | United Kingdom . |

*Primary Examiner*—W. J. Shine
*Attorney, Agent, or Firm*—Joseph J. Allocca

[57] ABSTRACT

A noble Group VIII metal on low fluoride content small particle size refractory metal oxide isomerization catalyst is disclosed. The catalyst is characterized by having a fluoride content in the range of 0.1 to up to but less than 2 wt %, preferably 0.1 to 1.5 wt %, more preferably 0.2 to 1.0 wt %, a particle diameter of less than 1/16 inch and a preferred noble Group VIII metal loading in the range of 0.1 to 2.0 wt %. The preferred small particle support is 1/20 inch trilobe alumina.

The catalyst has been found to be useful for wax isomerization demonstrating excellent selectivity to oil boiling in the lube oil range while also having acceptable activity. The catalyst is also useful for waxy distillate and waxy raffinate isomerization.

7 Claims, No Drawings

SMALL PARTICLE LOW FLUORIDE CONTENT CATALYST

DESCRIPTION OF THE INVENTION

The present invention is directed to a noble Group VIII metal on low fluoride content small particle size isomerization catalyst. The catalyst is characterized by having a fluoride content in the range of 0.1 to up to but less than 2 wt %, preferably 0.1 to 1.5 wt %, more preferably 0.2 to 1.0 wt %, a refractory metal oxide particle diameter of less than 1/16 inch and a noble metal content of 0.1 to 2.0 wt %. Preferably the refractory metal oxide is alumina or material containing alumina, preferably predominantly (i.e. >50%) alumina, more preferably an alumina such as gamma or eta alumina extrudates. The most preferred alumina is 1/20 inch alumina trilobes.

The noble Group VIII metal on low fluoride content small particle size refractory metal oxide isomerization catalyst wherein the fluoride content is in the range of 0.1 to 2 wt % can be made, preferably using $NH_4F$ as the fluorine source.

The catalyst of the present invention is made by depositing the noble Group VIII metal on the small particle size refractory metal oxide support, calcining the metal loaded support and fluoriding the metal loaded support using a fluoride source e.g. HF or $NH_4F$, preferably $NH_4F$, to a fluoride level of 0.1 to up to but less than 2 wt %.

As previously stated, the support is of small particle size, less than 1/16 inch in diameter.

The refractory metal oxide support is preferably alumina or material containing alumina, preferably predominantly (i.e. >50%) alumina, more preferably gamma or eta alumina, most preferably 1/20 inch alumina trilobes.

The noble Group VIII metal is deposited on the support by any convenient method such as soaking, spraying, incipient wetness, solution exchange, etc., followed by drying, typically conducted at 120° to 150° C., and calcination, typically conducted at 350° to 500° C., preferably 450° to 500° C., typically for from 1 to 5 hours. Suitable sources of noble Group VIII metal include chloroplatinic acid and fluoro platinic acid. Metal loading is from 0.1 to 2 wt %, preferably 0.1 to 1.0 wt %, most preferably, 0.2 to 0.6 wt %. The preferred metal is platinum or palladium.

Following metal deposition, drying and calcination, the catalyst is fluorided. Fluoride levels of 0.1 to up to but less than 2.0 wt % are produced using HF or $NH_4F$ solution, preferably $NH_4F$ solutions. Following fluoriding the catalyst is dried. Fluoriding is conducted using any convenient method such as soaking, spraying, incipient wetness, etc.

The small particle size catalyst is usually activated prior to use by heating in a hydrogen atmosphere (e.g. pure or plant hydrogen (i.e. ~60 to 70 vol. % $H_2$)) to from 350° to 500° C. for from 1 to 48 hours or longer.

A typical hydrogen activation profile may be a period of 2 hours to go from room temperature to 100° C. with the catalyst being held at 100° C. from 0 to 2 hours, then the temperature is raised from 100° to about 350° C. to 500° C., preferably 350° to 450° C. over a period of 1 to 3 hours with a hold at the final temperature of from 1 to 4 hours. Alternatively, the catalyst can be hydrogen activated by heating from room temperature to the final temperature of 350° to 500° C. preferably 350° to 450° C. over a period of 2 to 7 hours with a hold at the final temperature of 0 to 4 hours. Similarly, hydrogen activation can be accomplished by going from room temperature to the final temperature of 350° to 500° C., preferably 350° to 450° C. in 1 hour.

The small particle size catalyst can be produced by starting with a small particle, one already smaller than 1/16 inch in diameter, preferably a 1/20 inch alumina trilobe and depositing the noble Group VIII metal and fluoride thereon. Alternatively, a larger particle can be metal loaded and fluorided to the desired level, then crushed and sized to recover catalyst particles of less than 1/16 inch in diameter.

The catalyst of the present invention can be used in isomerization processes. Waxes such as petroleum slack waxes, synthetic waxes as obtained from a Fischer-Tropsch process can be isomerized to oils boiling in the lube oil range. In addition, distillates and raffinates can be isomerized to reduce the wax content of said oils, increasing the yield of oil boiling in the lube oil boiling range having a viscosity index higher than that of the starting distillate or raffinate.

The wax which may be isomerized using this catalyst is any readily available natural wax. Natural waxes include those waxes obtained by dewaxing natural hydrocarbons, commonly called slack waxes. Slack waxes contain anywhere from 0 to 45% oil more typically 35% oil or less depending on the molecular weight of the oil being dewaxed to a specific pour point.

Slack waxes, coming from natural petroleum sources, contain numerous molecular species such as heteroatom compounds and polynuclear aromatic materials which are detrimental to the life and activity of isomerization catalysts. Thus, the heteroatoms should be removed prior to isomerization using a hydrotreating catalyst under mild hydrotreating conditions. Exemplary of hydrotreating catalysts are Ni/Mo on alumina, Co/Mo on alumina. Hydrotreating conditions are 250°–400° C.; 0.1–10 LHSV; 500 to 3000 psi $H_2$; 500–2000 SCF $H_2$/bbl. Following hydrotreating acceptable levels will be a nitrogen content of about 1-5 ppm, preferably 2 ppm and less and a sulfur content of about 1-20 ppm, preferably 5 ppm and less.

Synthetic waxes such as those obtained from Fischer-Tropsch synthesis processes can also be used as the wax feed to the isomerization process. Because such waxes are usually free of sulfur and nitrogen compounds, hydrotreating to remove S and N is not needed. Synthetic waxes, however, may contain other polar or oxygenated components and trace metals which should be removed prior to isomerization so that the resulting isomerate exhibits satisfactory daylight and oxidation stability. The waxes are also very high melting and should be softened somewhat to facilitate handling prior to isomerization. These two goals can be accomplished by treating the synthetic wax with a hydrotreating catalyst and hydrogen to reduce the oxygenate and trace metal levels of the wax and to partially hydrocrack/isomerize the wax to lighter and lower melting point materials. This pretreatment of synthetic Fischer-Tropsch waxes is one aspect of the invention taught in copending application U.S. Ser. No. 283,643 filed Dec. 13, 1988 which is a CIP of U.S. Ser. No. 134,797 filed Dec. 18, 1987 in the names of Wachter, Boucher and Hamner.

Isomerization over the small particle size catalyst is conducted at a temperature of 300°–400° C., 500 to 3000 psi H$_2$; 1000–10,000 SCF/bbl, H$_2$, and 0.1–10.0 LHSV, preferably 320°–385° C., 1000–1500 psi H$_2$, and 1–2 V/V/hr.

An integrated process to produce lube base stock oils or blending stocks by isomerizing waxes is disclosed in copending application U.S. Ser. No. 283,664 filed Dec. 13, 1988, which is a continuation-in-part of Ser. No. 135,150, filed Dec. 18, 1987 in the names of Cody, Achia, Bell, West and Wachter. The use of the present catalyst in a wax isomerization process is disclosed and claimed in copending application U.S. Ser. No. 285,462 filed even date herewith, in the names of Cody and Brown.

The desired conversion of wax to a finished grade lube oil is dictated by 2 factors: (1) the ability of the dewaxing unit to process the unconverted wax remaining in the isomerate and (2) and maximum production of dewaxed oil boiling in the lube oil range, e.g. about 330° C.+, preferably 370° C.+; thus high levels of conversion to non-lube boiling range products are undesirable. Consequently, a balance must be struck between low conversions (favoring lubes production but sending too much residual wax to the dewaxer) and high conversion (sending low levels of wax to the dewaxer but producing fuels at the expense of lubes).

Following isomerization the isomerate is fractionated into a lubes cut and fuels cut, the lubes cut being identified as that fraction boiling in the 330° C.+ range, preferably the 370° C.+ range or even higher. The lubes fraction is then dewaxed to a pour point of about −21° C. or lower. Dewaxing is accomplished by techniques which permit the recovery of unconverted wax, since in the process of the present invention this unconverted wax is recycled to the isomerization unit. It is preferred that this recycle wax after the removal of the solvent used in the dewaxing operation be recycled to the hydrotreater reactor. A separate stripper can be used to remove entrained dewaxing solvent or other contaminants.

Solvent dewaxing utilizes typical dewaxing solvents, such as C$_3$-C$_6$ ketones (e.g. methyl ethyl ketone, methyl isobutyl ketone and mixtures thereof), C$_6$-C$_{10}$ aromatic hydrocarbons (e.g. toluene) mixtures of ketones and aromatics (e.g. MEK/toluene), autorefrigerative solvents such as liquefied, normally gaseous C$_2$-C$_4$ hydrocarbons such as propane, propylene, butane, butylene etc. at filter temperature of −25° to −30° C. It has been discovered that the preferred solvent to dewax the isomerate under miscible conditions and thereby produce the highest yield of dewaxed oil at a high filter rate is a mixture of MEK/MIBK (20/80 v/v) used at a temperature in the range of −25° to −30° C. Pour points lower than −21° C. can be achieved using lower filter temperatures and other ratios of said solvent. Further, when dewaxing isomerate made from a microwax, e.g. Bright Stock slack wax it has been found to be preferred that the fraction of the isomerate which is dewaxed is the "broad heart cut" identified as the fraction boiling between about 330° to 600° C., preferably 370°–600° C. When processing wax fractions higher than 1050° F.+ the heavy bottoms fraction contains appreciable unconverted wax so they can be recycled to the isomerization unit.

It has also been found that prior to fractionation of the isomerate into various cuts and dewaxing said cuts, the total liquid product (TLP) from the isomerization unit can be advantageously treated in a second stage at mild conditions using the isomerization catalyst or a noble Group VIII on refractory metal oxide catalyst to reduce PNA and other contaminants in the isomerate and thus yield an oil of improved daylight stability. This aspect is covered in copending application U.S. Ser. No. 283,569, which is a continuation-in-part of U.S. Ser. No. 135,149, filed Dec. 18, 1987 in the names of Cody, MacDonald, Eadie and Hamner.

In that embodiment, the total liquid product is passed over a charge of the isomerization catalyst or over noble Group VIII on e.g. gamma alumina catalyst under mild conditions, e.g. a temperature in the range of about 170°–270° C., preferably about 180° to 220 C. at a pressure of about 300–1500 psi H$_2$, preferably about 500 to 1000 psi H$_2$, a hydrogen gas rate of about 500 to 10,000 SCF/bbl, preferably 1000 to 5000 SCF/bbl and a flow velocity of about 0.25 to 10 V/V/hr., preferably about 1–4 V/V/hr.

The total liquid product can be treated under these mild conditions in a separate, dedicated unit or the TLP from the isomerization reactor can be stored in tankage and subsequently passed through the isomerization reactor under said mild conditions. It has been found to be unnecessary to fractionate the total liquid product prior to this mild second stage treatment. Subjecting the whole TLP to this mild second stage treatment produces an oil product which upon subsequent fractionation and dewaxing yields a base oil exhibiting a high level of daylight stability and oxidation stability.

Waxy distillate and waxy raffinates isomerization, disclosed and claimed in copending application U.S. Ser. No. 285,436 filed even date herewith in the names of Cody and Brown, can use the low fluoride small particle size catalyst of the present invention in the isomerization step. In that process waxy distillates, raffinates or other waxy lube oil stocks (e.g. oils containing as little as 10% but more typically about 30% or more wax) are hydrotreated to reduce sulfur and nitrogen, the hydrotreated feed is passed over a low fluoride content isomerization catalyst in the presence of hydrogen. It is preferred that the low fluoride catalyst used be the low fluoride, small particle size catalyst of the present invention. Following the isomerization the isomerized oil can be passed to a low temperature hydrogenation stage wherein the catalyst can be the same as used in the isomerization stage or it can be a higher fluoride content catalyst on large particle size support.

EXAMPLES

Example 1

Five catalysts were prepared and compared for wax isomerization. Catalysts 1 and 2 were low fluoride content materials using 1/20 inch alumina trilobes as support. Catalyst 3 was a low fluoride content material which used a 1/16 inch extrudate as support. Catalysts 4 and 5 were high fluoride content materials which used 1/16 inch alumina extrudates and 1/20 inch alumina trilobes, respectively, as support. All of the catalysts were fluorided using aqueous NH$_4$F solutions, contained platinum as the catalytic metal component, and were calcined at 400° C. after fluorination. The catalysts were evaluated in a tubular reactor containing 200 cc's of catalyst with feed introduced in an up-flow mode.

The isomerization feed was a slack wax obtained from the dewaxing of a 600N oil. The slack wax contained about 20% oil in wax and was hydrotreated using commercial KF-840 catalyst (Ni/Mo alumina) to a sulfur level of <5 ppm and a nitrogen level of <1 ppm.

The results of isomerizing the wax using the five catalysts are summarized in Table 1.

TABLE 1

YIELD ADVANTAGES AT LOW FLUORIDE CONTENT AND SMALL PARTICLE SIZE

| Catalyst | 1 | 2 | 3 | 4 | 5 |
|---|---|---|---|---|---|
| Composition | | | | | |
| F, wt % | 0.93 | 0.5 | 0.42 | 7.0 | 6.7 |
| Pt, wt % | 0.3 | 0.3 | 0.3 | 0.58 | 0.62 |
| Particle Diameter (inch) | 1/20 | 1/20 | 1/16 | 1/16 | 1/20 |
| Shape (1) | T | T | E | E | T |
| Reaction Temp, °C.(2) | 355 | 370 | 380 | 320 | 330 |
| Pressure, psi $H_2$ | 1000 | 1000 | 1000 | 1000 | 1000 |
| LHSV, v/v/hr | 1.0 | 1.0 | 1.0 | 1.0 | 1.0 |
| Gas Rate, SCF/B | 2500 | 2500 | 2500 | 2500 | 2500 |
| 370° C. + Yield on feed, wt % (3) | 60 | 67 | 55 | 50 | 50 |

(1) E = extrudate, T = trilobe
(2) Temperature required for 70% conversion of wax in feed after 250 hr. on stream.
(3) Maximum once-through yield of 370° C. + oil based on oil content determination using 100% MIBK.

From the above it is clear that an isomerization catalyst having low fluoride content and small particle size, i.e. a particle size of less than 1/16 inch exhibits superior performance for wax isomerization as compared to catalyst having high fluorine contents or large particle size. Catalysts 1 and 2 which possess both low fluorine content and small particle size are superior to catalyst 3, which has low fluorine but larger particle size and to catalyst 5 which has small particle size but high fluorine and to catalyst 4 which had both high fluorine and larger particle size. Reference to catalyst 5 shows that possession of small particle size is not in itself sufficient to produce a catalyst of superior selectivity. Similarly reference to catalyst 3 shows that low fluorine content is also not in itself sufficient to produce a catalyst of superior selectivity. It is necessary that the catalyst possess both low fluorine and small particle size.

Example 2

This example is offered to show that catalysts fluorided using aqueous $NH_4F$ solutions and having noble Group VIII metal are preferred.

Three catalysts were prepared on 1/16 inch extrudate. While this size base is not within the scope of the present invention, the example is offered to show that $NH_4F$. is the preferred fluoriding solution.

The feed is hydrotreated slack wax obtained by dewaxing 600N oil, and is the same as described in Example 1, but the test unit was smaller with only 80 cc of catalyst charge. The feed was again introduced in an up-flow mode. Experience has shown that yields obtained from the smaller charge unit are consistently lower than the yields obtained from the larger unit of Example 1.

The results of isomerizing the wax using these three different catalysts are summarized in Table 2.

TABLE 2

$NH_4F$ TREATED CATALYST IS MORE ACTIVE THAN HF TREATED CATALYST

| Catalyst (1) | 6 | 7 | 8 |
|---|---|---|---|
| Metal, wt % | 0.3, Pt | 0.3, Pt | 2.0, Ni |
| F, wt % | 0.5 | 0.5 | 0.5 |
| Particle Size | 1/16" Extrudate | 1/16" Extrudate | 1/6" Extrudate |
| Source of Flouride | HF (aq) | $NH_4F$ (aq) | $NH_4F$ (aq) |
| Conditions | | | |
| Temperature, °C. | 380 | 364 | 385 |
| Pressure, psi $H_2$ | 1000 | 1000 | 1000 |
| Space Velocity, v/v/hr | 0.9 | 0.9 | 0.9 |
| Gas Rate, SCF/B, $H_2$ | 5000 | 5000 | 5000 |
| Time on Stream, hr | 80 to 81 | 102 to 104 | 65 to 66 |
| 370° C. + Yield on feed, wt % (2) | 52.9 | 52.2 | 40.6 |
| 370° C.− | 28.5 | 23.5 | 27.9 |

(1) All catalyst 1/16" extrudates
(2) Maximum once-through yield of 370° C. + oil based oil content determination using 100% MIBK Catalysts 6 and 7 both contained the same level of fluoride loading (0.5 wt %) and the same amount of platinum (0.3 wt %). The only difference in their preparation was the type of fluoriding source used. Catalyst 6 was fluorided using aqueous HF while catalyst 7 was fluorided using aqueous $NH_4F$. Both catalysts were run to produce maximum yields of 370° C.+ oil. Both catalysts produced approximately the same amount of such oil (52.9% for catalyst 6 and 52.2% for catalyst 7) but catalyst 6, made using HF was 16° C. less active than catalyst 7, made using $NH_4F$. From this it is clear that catalysts made using $NH_4F$. as the fluoriding solution are preferred.

Likewise review of catalyst 8 wherein the catalytic metal is nickel shows that noble Group VIII metals are the metals of choice in preparing the wax isomerization catalysts of the present invention.

What is claimed is:

1. A refractory metal oxide catalyst of small particle size comprising a Group VIII noble metal and a low fluoride content in the range of 0.1 to up to but less than 2 wt % fluoride, and a refractory metal oxide particle diameter of less than 1/16 inch.

2. The catalyst of claim 1 wherein the fluoride content is in the range of 0.1 to 1.5 wt. % fluorine.

3. The catalyst of claim 1 wherein the refractory metal oxide is alumina.

4. The catalyst of claim 1, 2, or 3 wherein the refractory metal oxide is 1/20 inch alumina trilobe.

5. The catalyst of claim 4 wherein the Group VIII noble metal is Pt or Pd.

6. The catalyst of claim 5 wherein the Group VIII noble metal is present in the range of 0.1 to 2.0 wt %.

7. The catalyst of claim 1, 2 or 3 wherein the fluorine is deposited on the catalyst using $NH_4F$ solution.

* * * * *